(12) United States Patent
Birzer et al.

(10) Patent No.: US 8,788,976 B2
(45) Date of Patent: Jul. 22, 2014

(54) PROJECT NAVIGATOR FOR A HIERARCHICAL DISPLAY OF TECHNOLOGICAL OBJECTS, STORAGE MEDIUM AND ENGINEERING SYSTEM

(75) Inventors: Johannes Birzer, Rezelsdorf (DE); Markus Fister, Erlangen (DE); Raimund Kram, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 923 days.

(21) Appl. No.: 12/511,466

(22) Filed: Jul. 29, 2009

(65) Prior Publication Data

US 2010/0031199 A1    Feb. 4, 2010

(30) Foreign Application Priority Data

Jul. 31, 2008    (EP) .................................... 08013783

(51) Int. Cl.
*G06F 3/048* (2013.01)
*G06F 3/01* (2006.01)

(52) U.S. Cl.
USPC ........... 715/855; 715/810; 715/811; 715/853; 715/854

(58) Field of Classification Search
USPC ................................. 715/810–811, 853–855
See application file for complete search history.

(56) References Cited

U.S. PATENT DOCUMENTS

| | | | | |
|---|---|---|---|---|
| 6,965,803 | B2 * | 11/2005 | Bungert et al. | 700/83 |
| 7,120,874 | B2 * | 10/2006 | Shah et al. | 715/733 |
| 7,219,306 | B2 * | 5/2007 | Kodosky et al. | 715/763 |
| 7,650,574 | B2 * | 1/2010 | Nattinger | 715/763 |
| 7,890,868 | B2 * | 2/2011 | Shah et al. | 715/733 |
| 8,024,054 | B2 * | 9/2011 | Mairs et al. | 700/83 |
| 2003/0231211 | A1 * | 12/2003 | Shah et al. | 345/771 |
| 2004/0032429 | A1 * | 2/2004 | Shah et al. | 345/771 |
| 2005/0177816 | A1 * | 8/2005 | Kudukoli et al. | 717/105 |
| 2008/0039959 | A1 * | 2/2008 | Fister et al. | 700/56 |
| 2009/0088883 | A1 * | 4/2009 | Baier et al. | 700/110 |

FOREIGN PATENT DOCUMENTS

| | | |
|---|---|---|
| EP | 1 217 476 A2 | 6/2002 |
| EP | 1 310 841 A1 | 5/2003 |
| EP | 1 522 910 A1 | 4/2005 |
| WO | WO 2005124479 A1 | 12/2005 |

\* cited by examiner

*Primary Examiner* — Nicholas Augustine
(74) *Attorney, Agent, or Firm* — Henry M Feiereisen LLC

(57) ABSTRACT

A project navigator for displaying technological objects hierarchically on a display device, in particular on a computer, is provided. The technological objects are mutually interconnected and model a machine with cascaded synchronous control. The technological objects are selected by a user input facility. For a selected technological object, an associated input and/or output side connection tree for the technological object is then displayed together with further technological objects.

7 Claims, 5 Drawing Sheets

PROJECT NAVIGATOR FOR A HIERARCHICAL DISPLAY OF TECHNOLOGICAL OBJECTS, STORAGE MEDIUM AND ENGINEERING SYSTEM

CROSS REFERENCE TO RELATED APPLICATIONS

This application claims priority of European Patent Office Application No. 08013783.9 EP filed Jul. 31, 2008, which is incorporated by reference herein in its entirety.

FIELD OF INVENTION

The invention relates to a project navigator for the hierarchical display of technological objects on a display device, in particular on a computer. The technological objects are mutually interconnected and model a machine with cascaded synchronous control. The technological objects concerned can be selected by means of a user input facility.

The invention relates further to an advantageous use of a project navigator of this type for the hierarchical display of technological objects on a display device.

Finally, the invention relates to a storage medium on which a project navigator of this type is stored in a machine-readable form, together with an engineering system for configuring at least a part of a machine or a plant with cascaded synchronous control.

BACKGROUND OF INVENTION

The machines or parts of a plant with cascaded synchronous control might, for example, be a printing press, which generally has numerous printing units which are arranged in a cascaded fashion one after another. For their part, printing units of this type have several regulated motor-driven axles to transport a paper web, which is to be printed synchronously, through the numerous printing units. Here, the driven axles are not coupled with each other from a mechanical point of view, for example by means of a vertical shaft or toothed belt. The control and regulation of the driven axles is generally effected via a higher-level controller, on the basis of a guide value for the higher-level speed setting. From this guide value it is possible, for example, to derive appropriate conversion ratios, in the nature of a gearing. For the purpose of regulating the entire machine it is also possible to provide virtual axles which, in their turn, can provide a guide value for some of the axles. On the basis of the higher-level guide value it is possible in addition to specify speed differences, in the nature of a slippage, to enable various mechanical longitudinal tensions to be introduced into the paper web.

Alternatively, machines of this type may be a cellulose factory, a paper factory, a rolling mill or the like. The important point here is that several machine parts, arranged in a cascaded fashion one after another, are controlled in a synchronous running mode.

The control and regulation of the driven axles is preferably effected by so-called technological objects. These offer the user a technological view of the actuators and sensors, and make available technological functions for them. The technological objects are mainly software modules, which are executed in real time on a processor unit in the drive controller, such as for example on a drive controller of the SIMOTION type from Siemens. Via a relevant input interface and output interface, these can be parameterized for the applicable automation task. It is then possible in an engineering system, with the help of configuration tools, which are preferably graphical, to connect these technological objects in cascade.

However, in the case of a large complex project, with numerous connections, it becomes particularly difficult for a user to retain an "overview" of the complete project. In particular, it is difficult to determine the complete interconnection of movements and the overall flow of movement signals. This is so, for example, in the case of a diagnosis when the user is not familiar with the project.

A known solution to this problem is to have the object connections on the input side displayed in specific masks on the individual technological objects and/or to display linkages in a project navigator. In doing so, the known project navigators are, in their characteristic graphical appearance and their method of use, follow closely the Windows Explorer which is generally familiar to PC users. The user is thereby enabled to navigate through the entire project structure. Such a structure might, for example, be based on a quantitative structure required for the machine.

SUMMARY OF INVENTION

However, until now it has been impossible for the user of a conventional project navigator to have all the connections of a technological object displayed. For this purpose, the technological objects concerned must be individually preselected, and their further connections determined. The user must then navigate by hand from technological object to technological object.

It is therefore an object of the invention to specify a project navigator which permits an improved display of the flow of movement signals and of the object interconnections in a project.

A further object is to specify a suitable use of a project navigator of this type, a storage medium with a stored and machine-readable project navigator of this type, together with an engineering system for the purpose, among others, of executing a project navigator of this type.

The object of the invention is achieved with a project navigator, a computer readable medium and an engineering system as claimed in the independent claims. Advantageous forms of embodiments are specified in the dependent claims. A suitable use of the project navigator for displaying technological objects on a display device is for example for a paper printing press, a cellulose factory, a paper factory, a rolling mill or the like. On a storage medium is the project navigator stored in machine-readable form. Finally, an engineering system for the purpose, among others, of executing the project navigator on a processor in the engineering system is described.

For a selected technological object the connection tree associated with the input and/or output side of the technological object is displayed together with further technological objects. By this means it is advantageously possible, for each selected technological object, to display in a comprehensible hierarchical arrangement the associated connection tree on the input side and/or the associated connection tree on the output side. It is thereby advantageously possible in a diagnostic situation to make the finding of a fault simple and rapid.

In particular, the connection tree for the input and/or output side of the technological object, together with all the further subtrees, are displayed for a selected technological object.

With one form of embodiment of the project navigator, in an online mode of the machine the relevant effective connection is highlighted visually in the project navigator. By this means, the flow of movement signals which is presently effective in the project can be displayed to the user.

In particular, the technological objects model the technological functioning of an axle, a sensor, a guide value, a cam, a cam plate, a measuring head or the like. An appropriate symbolic representation of the technological objects in the project navigator gives the user a rapid overview of the functional relationships between the technological objects. Thus, for example, to give a more rapid overview and a better understanding it is possible to highlight, for example by a colored label or colored background, the technological objects which are currently active, such as for example a cam plate which is currently active.

It is especially advantageous if the parameters associated with an input or output interface of a selected technological object are displayed as system data. By this means, the user is given a detailed insight into the selected technological object.

The project navigator is realized as a software program or a software module, as appropriate. If it is stored on a storage medium in machine-readable form, the project navigator can then be executed directly by a processor in a control device or in a drive controller. The storage medium in question could be optical storage media such as for example a CD-ROM or DVD-ROM, magnetic storage media such as for example a diskette or hard disk, and in particular static storage media, such as for example a USB stick or a flash memory card. Examples of the latter are SD, CF or MM memory cards.

Finally, the object of the invention is achieved by an engineering system which has a display device, a user input facility and a processor for executing a project navigator in accordance with the invention, for displaying technological objects hierarchically on the display device. The display device will preferably be a monitor. Preferred user input facilities are a keyboard and a mouse.

BRIEF DESCRIPTION OF THE DRAWINGS

The invention and advantageous embodiments of the invention are described in more detail below by reference to the following figures, in which.

DETAILED DESCRIPTION OF INVENTION

Figure 1:
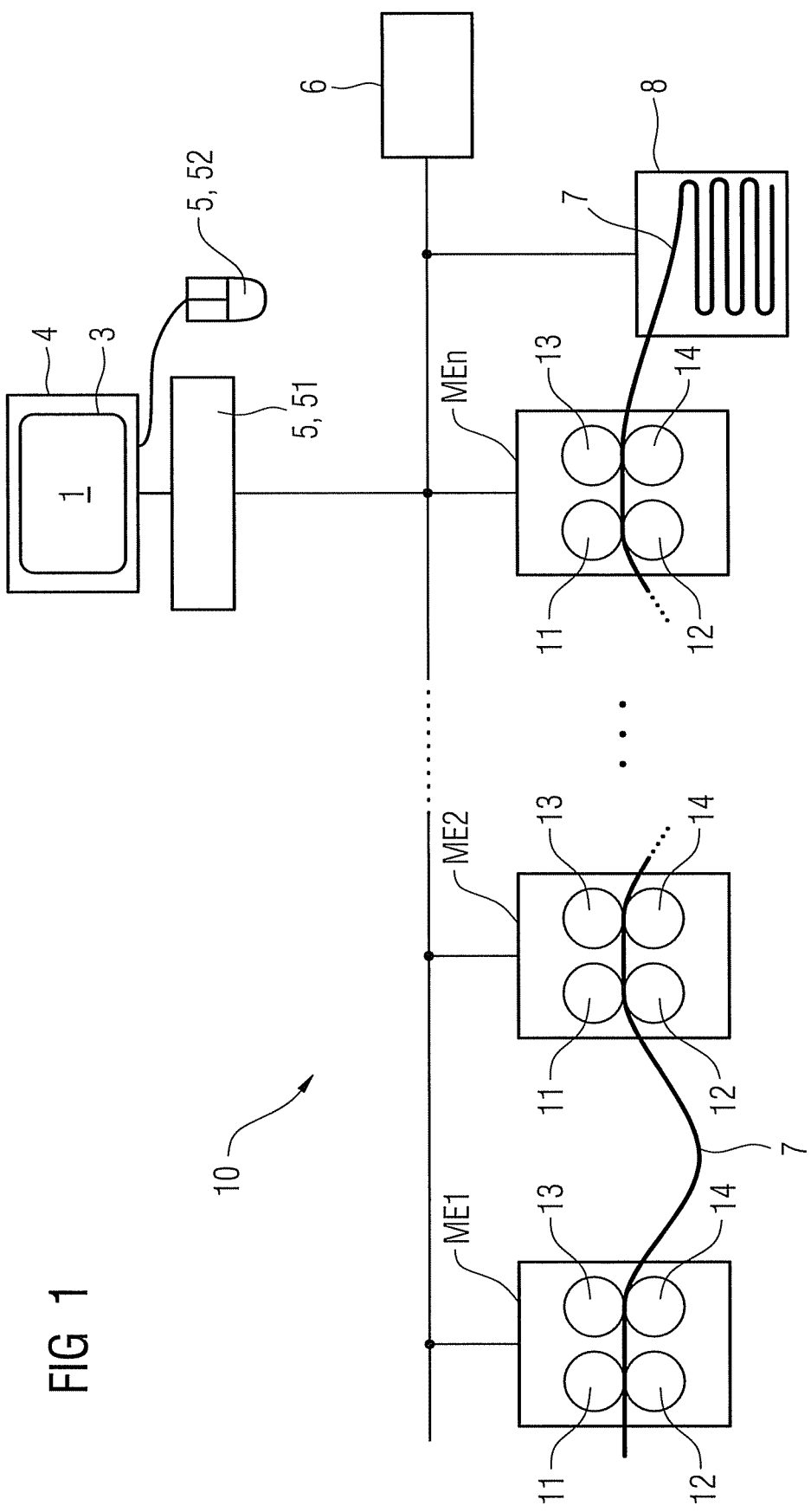
FIG. 1 shows a schematic representation of a printing unit with a series of cascaded printing units arranged one after another and operating synchronously, with a controller connected to it, and with an engineering system connected to it for executing a project navigator.

FIG. 1 shows a schematic representation of a printing press 10 with a series of cascaded printing units, arranged one after another and operating synchronously, shown as machine units ME1, ME2, MEn. Each printing unit ME1, ME2, MEn has by way of example four driven axles in the form of press rolls 11-14, which act in pairs to convey a paper web 7 onward to the next relevant printing unit ME1, ME2, MEn. In each of the printing units ME1, ME2, MEn, the appropriate primary printing colors can, for example, be applied. At the end of the cascade there is a follower machine 8 in the form of a paper storage device. Furthermore, all the printing units ME1, ME2, MEn and the follower machine 8 are linked via a bus system with a higher level controller 6. Also connected to the bus system is an engineering system 4, the uses of which include execution of a project navigator 1.

Alternatively, the machine 10 or part of the plant, as applicable, could be a cellulose factory, a paper factory, a rolling mill or the like.

Figure 2:
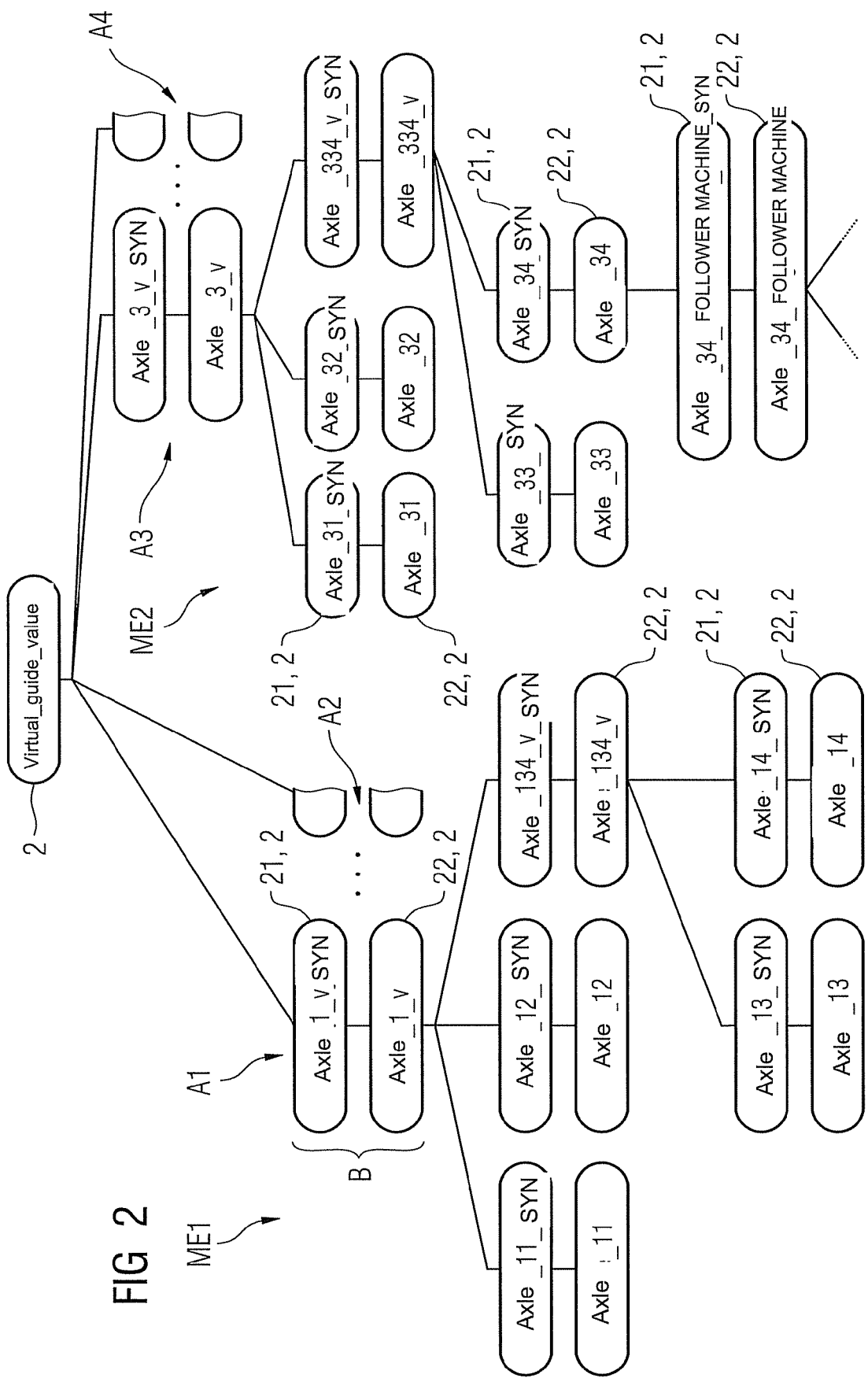
FIG. 2 shows a graphical representation of the mutually interconnected technological objects in a model of another synchronously operated cascaded printing press.

FIG. 2 shows a graphical representation of mutually interconnected technological objects 2 in another model of a cascaded printing press 10 operating in synchronous mode. The model, based on the technological objects 2, has by way of example two printing units ME1, ME2 in the form of machine units, together with numerous controlled axles. A1 to A4 designate virtual axles, below which in a hierarchical arrangement are assigned groups of "real" axles. The axles A1, A2 are here assigned to the first machine unit ME1, the axles A3, A4 to the second machine unit ME2. The two lines of dots indicate symbolically that there can be yet more "virtual" axles, together with further "real" axles, each in the form of technological objects 2. The virtual axles can be so-called computational axles, which might for example model a mechanical conversion ratio.

The upper part of FIG. 2 shows a technological object 2 called "Virtual guide value". This represents a higher level, i.e. global speed setting for the printing press. For the purpose of forming this guide value, the technological object 2 concerned can, for example, refer to a signal on its input side from a rotary position sensor, which has undergone data preparation. The "Virtual guide value" is fed down to the input sides of technological objects 21 "Axle 1 v SYN" and "Axle 3 v SYN" arranged below it. The abbreviation "SYN" stands for "SYNCHRONOUS" and the abbreviation "v" for "virtual". Arranged in each case below this are the associated, so-called "ganged", technological objects 22 "Axle 1 v" and "Axle 3 v". The ganging is indicated by a parenthesis with the reference mark B. This arrangement is advantageous in simplifying the hierarchical arrangement of the flow of movement signals in the project navigator 1 shown in the following figures FIG. 4 and FIG. 5.

In each of the levels below this there are further technological objects 2, of which for example "Axle 11 SYN", "Axle 12 SYN", "Axle 31 SYN" and "Axle 32 SYN" are directly linked to a local guide value, while "Axle 134 v SYN" and "Axle 334 v SYN" are linked to the virtual, higher-level machine guide value "Virtual guide value". By comparison with this, a local guide value permits setting options which have only a local effect. In a similar way, it is possible for yet further technological objects 2, arranged below this, to be linked in a corresponding manner to the relevant higher-level virtual guide value, to the virtual machine guide value "Virtual guide value" or to a local guide value.

Figure 3:
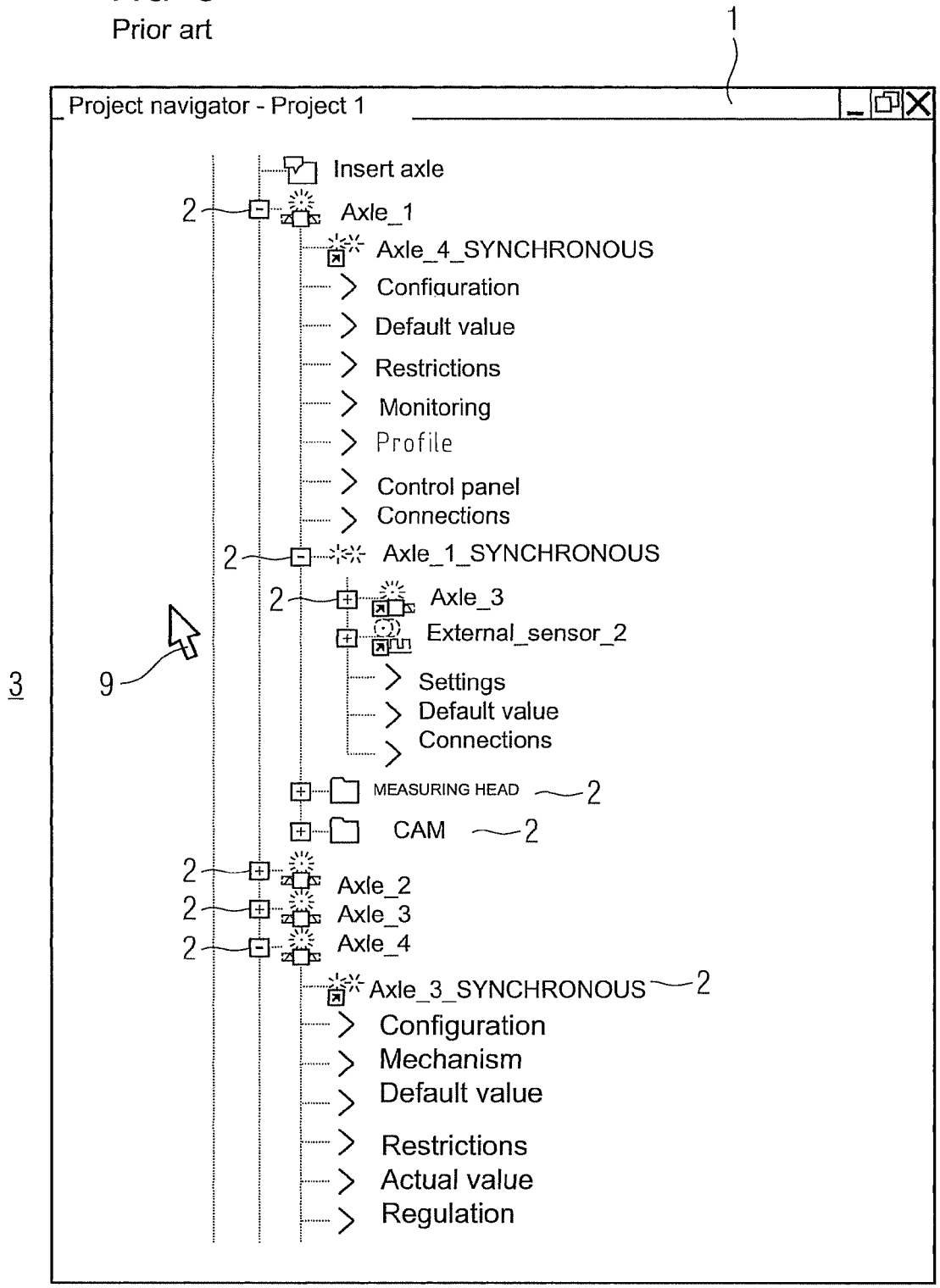
FIG. 3 shows an example of a project navigator in accordance with the prior art.

FIG. 3 shows an example of a project navigator 1 conforming to the prior art. The project navigator 1 shown is by way of example an application in a Windows window. The reference mark 3 refers to the entire area of the display device. The reference mark 9 refers to a mouse pointer for selecting the technological objects 2, represented symbolically by gearwheels and axles. Here, the technological objects 2 are provided for the purpose of modeling, for example, the technological functioning of an axle, a sensor, a guide value, a cam, a cam plate, a measuring head and the like. To this end, the technological objects 2 have a connectable input interface and a connectable output interface, not shown in more detail here.

At this it is possible, by selecting it, to access the sub-points labeled "Configuration", "Default value" etc.

As FIG. 3 shows, the representation displayed reflects only the project structure with the further technological objects 2 arranged under each of the technological objects 2 shown. In order to obtain further data in respect of the flow of movement signals for the technological objects 2 concerned, the further technological objects 2 arranged in the relevant "subdirectory" must be further investigated in respect of the connections on their input and output sides, in particular by selecting the associated subpoint "Connections".

Figure 4:
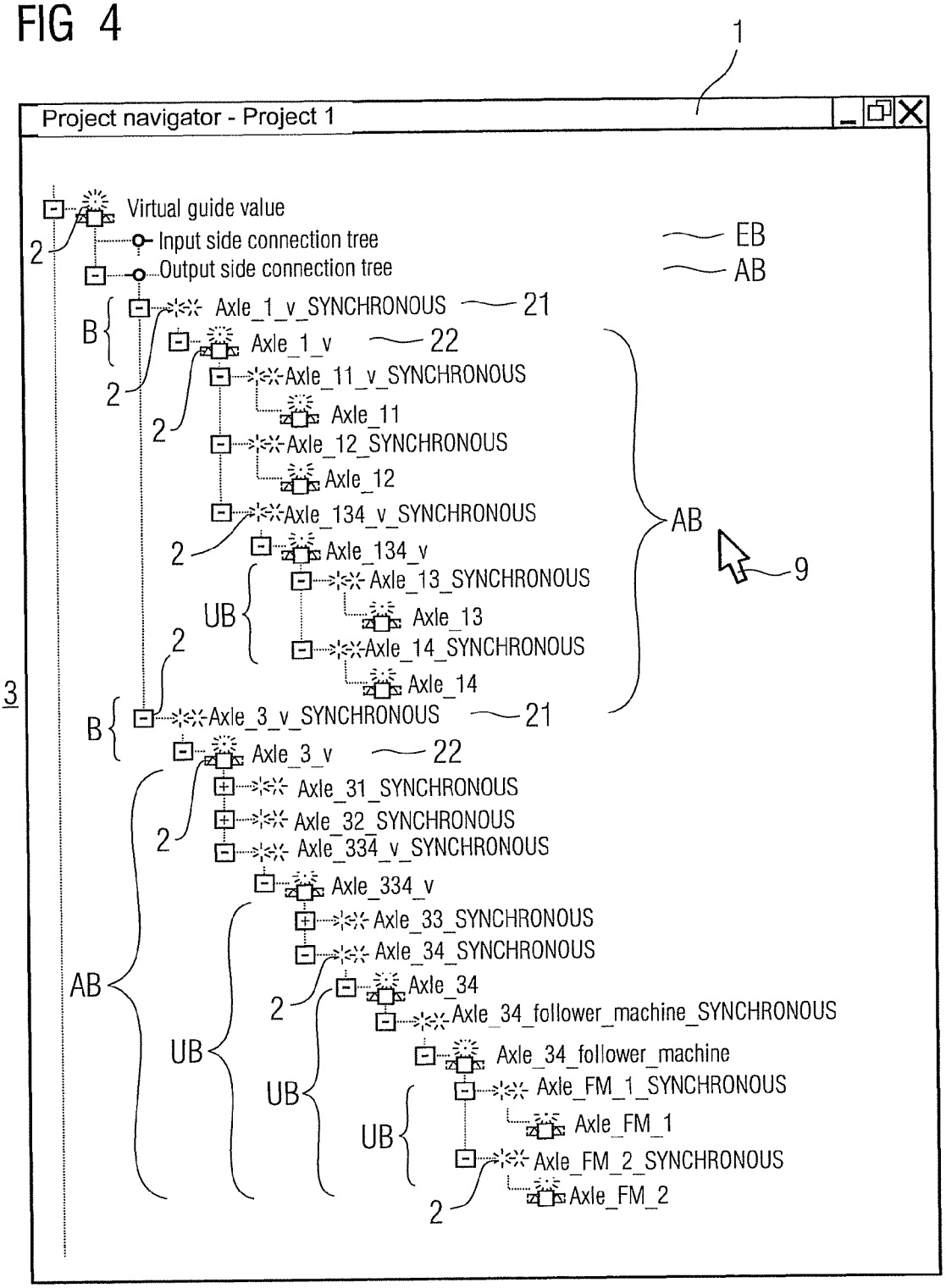
FIG. 4 shows an example of a project navigator with an "expanded" output side connection tree for a selected technological object, "Axle 1 v SYNCHRONOUS"

FIG. 4 shows an example of a project navigator 1 with an "expanded" output-side connection tree, AB, for a selected technological object 2 "Axle 1 v SYNCHRONOUS".

The project navigator 1 is now provided for the purpose of representing technological objects 2 hierarchically, to display the associated flow of movement signals on a display device 3. The reference mark 9 identifies a mouse pointer which can be controlled, using a PC mouse, to select technological objects 2. If the technological objects 2 concerned are now selected by means of a user input facility, such as the PC mouse, then the input and/or output side connection tree, EB, AB associated with a technological object 2 which has been selected will be displayed together with further technological objects 2. In other words, the mutual interconnections of the technological objects 2, implied by each of their movement signal flows for a modeled machine with cascaded synchronous control, will now be displayed independently of any project-related representation previously created.

Preferably, the display will show not only the associated input and/or output side connection tree EB, UB for any selected technological object 2 but also all the further subtrees UB for the technological object 2.

In the example in FIG. 4, only the output side connection tree AB for the top technological object 2 "Axle 1 v SYNCHRONOUS" is shown in expanded form. The display also already shows the output side subtree UB associated with the lower level technological object 2 "Axle 134 v". In a corresponding manner, the output side connection for the technological object 2 "Axle 3 SYNCHRONOUS" is displayed hierarchically in terms of the flow of movement signals. A comparison of this with FIG. 2 shows that the technological objects 2 in FIG. 4 which belong in the associated subdirectory "Output side connection tree" for a selected technological object 2 correspond in each case to the technological objects 2 "beneath it" in FIG. 2.

An important thought behind the present invention is that, apart from the navigation possibility offered by any project structure which has already been defined, which is independent of a structure based on the cascaded flow of movement signals, the inventive project navigator provides a further optional navigation possibility which permits navigation through a hierarchical, cascaded structure based on the flow of movement signals for the model of the machine.

FIG. 4 also shows the function of the "ganging", labeled with the reference mark "B". Here, the technological objects labeled with the reference mark 22 contain the relevant subtree UB associated with the ganged technological object 21, depending on whether this is an input side connection tree EB or an output side connection tree AB. This makes it a simple matter to integrate the additional optional hierarchical representation based on the flow of movement signals into the project structure which already exists.

Figure 5:
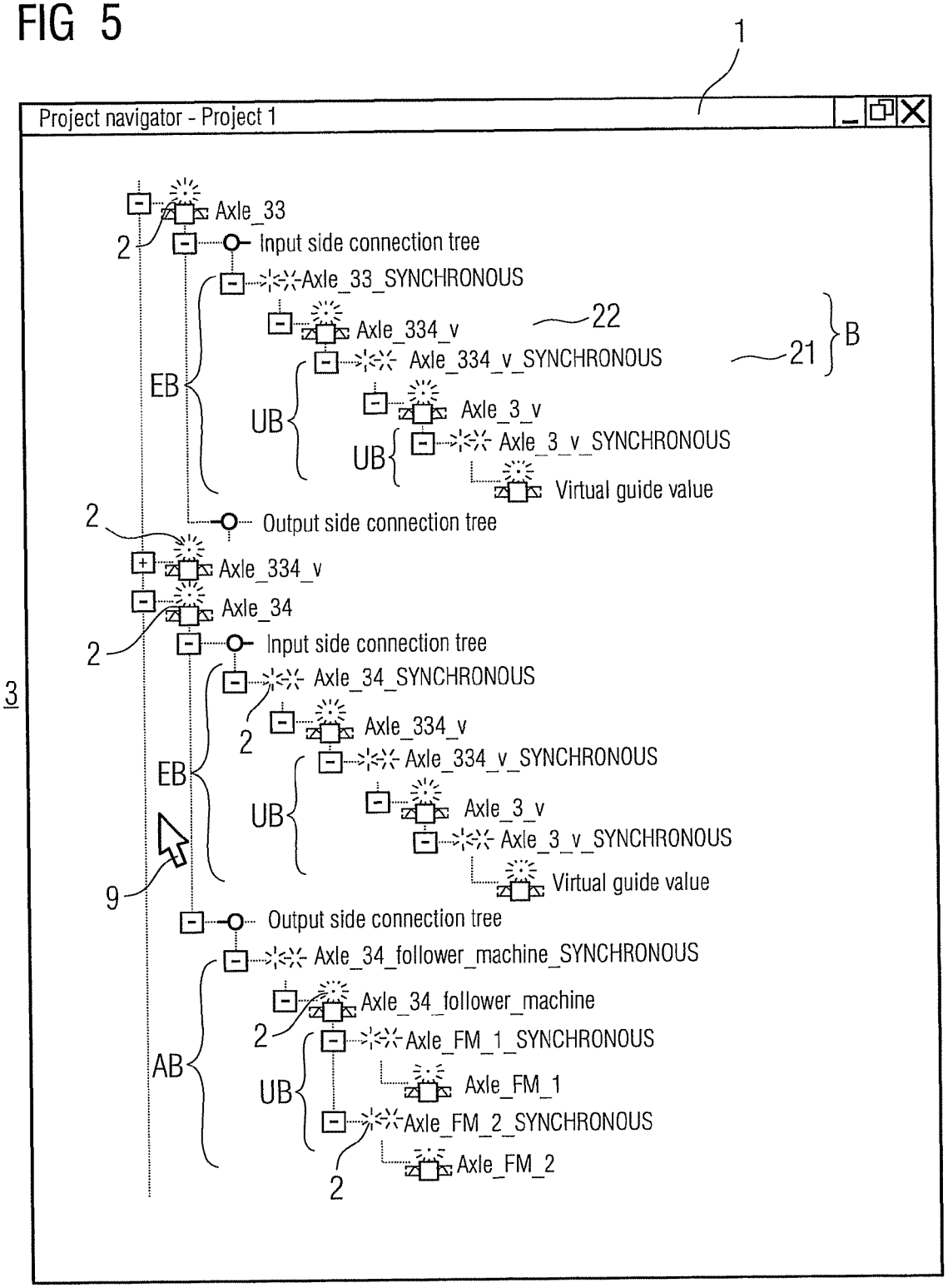
FIG. 5 shows an example with further "expanded" input and output side sub-connection trees for the selected technological objects "Axle 33 SYNCHRONOUS" and "Axle 34 SYNCHRONOUS" as shown in FIG. 4.

FIG. 5 shows an example with further "expanded" input and output side sub-connection trees UB for the selected technological objects "Axle33 SYNCHRONOUS" and "Axle34 SYNCHRONOUS" as shown in FIG. 4.

A comparison of this with FIG. 2 shows that the technological objects 2 in FIG. 5 which belong in the associated subdirectory "Input side connection tree" for a selected technological object 2 correspond in each case to the "higher level" technological objects 2 in FIG. 2.

The invention claimed is:

1. A project navigator for a hierarchical display of technological objects on a display device of a computer,
   wherein the technological objects are mutually interconnected and model a machine with a cascaded synchronous control,
   wherein each of the technological objects is selected by a user input facility,
   wherein, in a same hierarchical view, an input side connection tree and an output side connection tree associated with a selected technological object are displayed together with further technological objects on the display device together with all further sub-trees for both real and virtual axles such that a flow of movement signals of a model of the machine is displayed,
   wherein a relevant effective connection is visually highlighted in the project navigator in an online mode of the machine, and
   wherein a further navigation possibility permits navigation through a hierarchical cascaded structure based on the flow of movement signals of the model of the machine.

2. The project navigator as claimed in claim 1, wherein a relevant effective connection is visually highlighted in the project navigator in an online mode of the machine.

3. The project navigator as claimed in claim 1, wherein the technological objects model the technological functioning of an axle, a sensor, a guide value, a cam, a cam plate, a measuring head and the like.

4. The project navigator as claimed in claim 3, wherein the technological objects have a connectable input interface and a connectable output interface.

5. The project navigator as claimed in claim 1, wherein the project navigator is configured to display hierarchically technological objects of a paper printing press, a cellulose factory, a paper works, a rolling mill or the like on a display device.

6. A non-transitory computer readable medium storing in a machine-readable form a project navigator for a hierarchical display of technological objects on a display device of a computer,
   wherein the technological objects are mutually interconnected and model a machine with a cascaded synchronous control,
   wherein each of the technological objects is selected by a user input facility,
   wherein, in a same hierarchical view, an input side connection tree and an output side connection tree associated with a selected technological object are displayed together with further technological objects together with all further sub-trees for both real and virtual axles on the display device such that a flow of movement signals of a model of the machine is displayed,
   wherein a relevant effective connection is visually highlighted in the project navigator in an online mode of the machine, and
   wherein a further navigation possibility permits navigation through a hierarchical cascaded structure based on the flow of movement signals of the model of the machine.

7. An engineering system for configuring at least a part of a machine or a plant with a cascaded synchronous control system, comprising:
   a display device associated with a computer;
   user input facilities; and a processor for executing a project navigator for displaying technological objects hierarchically on the display device,
wherein the technological objects are mutually interconnected and model a machine with a cascaded synchronous control,
wherein each of the technological objects is selected by a user input facility,
wherein in a same hierarchical view, an input side connection tree and an output side connection tree associated with a selected technological object are displayed together with further technological objects for both real and virtual axles,
wherein a relevant effective connection is visually highlighted in the protect navigator in an online mode of the machine, and
wherein a further navigation possibility permits navigation through a hierarchical cascaded structure based on the flow of movement signals of the model of the machine.

* * * * *